United States Patent [19]
Gries et al.

[11] Patent Number: 5,476,530
[45] Date of Patent: Dec. 19, 1995

[54] SUBMICRON CARBONITRIDE POWDERS AND THEIR USE

[75] Inventors: Benno Gries; Gerhard Gille; Mario Salvadori, all of Goslar, Germany

[73] Assignee: Hermann C. Starck GmbH & Co. KG, Goslar, Germany

[21] Appl. No.: 56,322

[22] Filed: Apr. 30, 1993

[30] Foreign Application Priority Data

May 4, 1992 [DE] Germany ........................... 42 14 721.2
May 21, 1992 [DE] Germany ........................... 42 16 802.3

[51] Int. Cl.$^6$ .................................................. C22C 29/04
[52] U.S. Cl. .................................. 75/238; 75/242; 501/87; 501/96; 423/371; 423/364
[58] Field of Search ................. 75/238, 242; 501/87, 501/96; 423/371, 380, 364

[56] References Cited

U.S. PATENT DOCUMENTS

| | | | |
|---|---|---|---|
| 3,904,736 | 9/1975 | Triggiani | 423/251 |
| 3,994,692 | 11/1976 | Rudy | 29/182.5 |
| 4,049,876 | 9/1977 | Yamamoto et al. | 428/932 |
| 4,145,213 | 3/1979 | Oskarsson et al. | 75/238 |
| 4,333,915 | 6/1982 | Iwai et al. | 423/324 |
| 5,147,831 | 9/1992 | Zeiringer | 501/96 |
| 5,314,656 | 5/1994 | Munir | 419/13 |

FOREIGN PATENT DOCUMENTS

| | | |
|---|---|---|
| 0447388A | 2/1991 | European Pat. Off. . |
| 0464396A | 6/1991 | European Pat. Off. . |
| 0447388 | 9/1991 | European Pat. Off. . |
| 0042660 | 12/1991 | European Pat. Off. . |
| 0464396 | 1/1992 | European Pat. Off. . |
| 2420768A | 9/1975 | Germany . |
| 1188011 | 4/1970 | United Kingdom . |

OTHER PUBLICATIONS

Carbothermal Reduction and Nitriding of $TiO_2$, Journal of the European Ceramic Society 5 (1989) 257–265, Essex, GB.

ASTM Designation: B330–88, pp. 128–131 Standard Test Method for Average Particle Size of Powders of Refractory Metals and Their Compounds by the Fisher Sub–Sieve Sizer. HCST DIN 66 131 (Oct. 1973), pp. 1–7 (No translation).

Primary Examiner—Ngoclan Mai
Attorney, Agent, or Firm—Jerry Cohen

[57] ABSTRACT

This invention relates to submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_M^{(5)} Me^{(6)}_{1-L-M})(C_{1-y}N_y)_z$ with $0.50 \leq L \leq 1$; $0 \leq m \leq 0.15$; $0 \leq (1-L-M) \leq 0.50$; $0.10 \leq y \leq 0.95$ and $z \geq 0.90$, to a process for the production of these powders and to their use.

7 Claims, 5 Drawing Sheets

10 μm

10μm

SUBMICRON CARBONITRIDE POWDERS AND THEIR USE

This invention relates to submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_M^{(5)} Me_{1-L-M}^{(6)})(C_{1-y}N_y)_z$ with $0.50 \leq L \leq 1$; $0 \leq 0.15$; $0 \leq (1-L-M) \leq 0.50$; $0.10 \leq y \leq 0.95$ and $z \geq 0.90$, to a process for the production of these powders and to their use.

By virtue of constant improvements in alloys and also technological improvements (for example pressure sintering), modern carbonitride cermets are capturing a market steadily increasing both in extent and scope of application as cutting materials, forming tools and high-quality low-wear parts. This development is determined by the fact that, by virtue of their combination of resistance to wear, hardness at high temperatures and thermal stability, these cermets conform exactly to present trends in tool development.

Thus, modern metal working techniques, the increasing number of precision and smoothing operations and the greater use of relatively high-alloy construction steels require adequate edge stability and high thermal wear resistance of machining and forming tools, which are exactly the properties exhibited by the TiCN cermets.

These are various known processes for the production of titanium carbonitrides.

Thus, the separate synthesis of TiC and TiN by carburizing or nitriding of Ti with subsequent homogenization in accordance with the following equation:

$$yTiN+(1-y)TiC \rightarrow TiC_{1-y}N_y \qquad (1)$$

at temperatures T>1700° C. and with holding times t>2 h is still the most common method of production. According to DE-A 24 20 768, which starts out from the separate production of carbides and nitrides, carbide/metal mixtures of carbide/nitride mixtures are calcined under nitrogen in such a way that spinodally separated carbonitrides containing nitrogen-rich phases of the IVa metals and low-nitrogen phases of the Va and VIa metals are formed. This spinodal separation is said to lead to improved sintering behavior of the carbonitrides because the gassing processes are reduced, the wetting ratios between binder and low-nitrogen hard-material phase are improved and particle growth is reduced. However, due to the long-time calcination treatments and the intensive grinding steps which they necessitate, the disadvantages of a broad particle size distribution, an unfavorable particle shape and selective particle growth have to be accepted.

In addition, the average particle sizes of these carbonitrides are distinctly above 1 μm and the cermets produced from them have a grain structure with particle sizes of greater than 1 μm or high standard deviations (scatter ranges) of the particle sizes. The temperatures and holding times required for diffusion reaction are responsible for this heavy sintering of the primary particles. Working up to powders with average particle sizes of 2.5 μm and less (for example in attritors) is accompanied by the formation of large amounts of broken particles and a correspondingly high proportion of cleavage surfaces through primary particle fracture.

EP-A 447 388 and EP-A 464 396 describe the carbothermal reduction and nitriding of $TiO_2$ under nitrogen in accordance with the following equation:

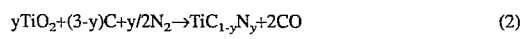

$$yTiO_2+(3-y)C+y/2N_2 \rightarrow TiC_{1-y}N_y+2CO \qquad (2)$$

at temperatures T>1600° C. and with holding times t>2 h. Through reduced synthesis temperatures and holding times coupled with suitable nitrogen partial pressures, this process enables the particle sizes to be reduced. However, the average particle diameter is still between 1.3 and 2.0 μm and the scatter range only reaches (delta) $d=(d_{(90)}-d_{(10)})>2$ μm (centrifuge).

Although it is possible in principle by these processes to produce less sintered carbonitride powders, which also leads to narrower range powders in the event of subsequent grinding, the average particle size is still distinctly above 1 μm. The grain structure of a cermet produced with this carbonitride is comparable with the structure obtained where an intensively ground, agglomerated carbonitride is used. Although intensive grinding of the carbonitride thus produced or the cermet mixture produced therefrom reduces the average grain size in the cermet grain structure, it also increases the scatter range of the corresponding characteristic dimensions of the grain structure.

Finally, deposition from the gas phase in accordance with the following reaction:

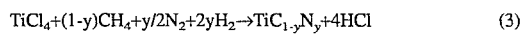

$$TiCl_4+(1-y)CH_4+y/2N_2+2yH_2 \rightarrow TiC_{1-y}N_y+4HCl \qquad (3)$$

at temperatures of 700° to 950° C. is also known.

Extremely fine powders having optical primary sizes of <0.1 μm can be produced in this way through the reaction of the gaseous species. However, due to the large, highly reactive surface, the products also formed during the reaction, such as for example HCl and $NH_4Cl$, are adsorbed onto the surfaces of the powders in quantities of up to a few tenths percent by weight and lead during sintering to adhesion and gassing problems which, ultimately, adversely affect development of the grain structure and also cause porosity and/or negatively influence the mechanical properties through unfavorable grain boundary segregations. In addition, the gas phase deposition of TiCN powders is not an economically acceptable process for cermet cutting materials for reasons of cost.

Another disadvantage which is still limiting the use of cermets is their lower ductility at normal temperature compared with conventional TC hard metals. This reduced ductility or strength limits their use as machining tools, particularly in application involving exacting mechanical demands, such as cutting with high feed rates and interruptions.

Although improvements in ductility can be obtained by higher binder metal contents, wear resistance and high temperature stability are adversely affected so that the advantages of cermets in this regard are relativized or even totally eliminated.

However, major advances can be expected from fine-particle and uniform, homogeneous grain structures. This in turn presupposes fine-particle carbonitride powders which show defined and uniform particle growth when combined with metals of the Fe group by liquid-phase sintering. If the particle fineness of the carbonitride powders is obtained by grinding processes, intensive and selective particle growth generally occurs, which produces correspondingly inhomogeneous structures. Grading and sizing after grinding afford only limited assistance and incur additional costs.

In addition to particle fineness, the uniformity of the grain structure is crucial to such properties as fracture toughness, fatigue strength and creep resistance. A broad particle size distribution reduces the fatigue threshold and fracture toughness in the same way as inhomogeneous binder metal distributions or hard-material particles agglomerated during sintering, but not separated by binder metal.

The critical static or cyclic loads, which lead to crack propagation in cermets or hard metals and which determine fracture toughness and fatigue strength, are in turn determined by the weak spots and inhomogeneities along the crack front. In addition to pores and foreign inclusions (impurities), coarse and agglomerated hard-material particles, binder pools, weak hard-material/hard-material or hard-material/binder grain boundaries and other inhomogeneities in the grain structure are the weakest link for the local beginning of crack growth.

Accordingly, the problem addressed by the present invention was to provide a carbonitride hard-material powder which would not have any of the described disadvantages of known powders.

These requirements are satisfied by submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_M^{(5)} Me^{(6)}_{1-L-M})$ $(C_{1-y}N_y)_z$ with $0.50 \leq L \leq 1$; $0 \leq m \leq 0.15$; $0 \leq (1-L-M) \leq 0.50$; $0.10 \leq y \leq 0.95$ and $z \geq 0.90$, which are characterized in that the particle shape factor f determined from SEM image analyses lies within the limits $0.80 \leq f \leq 0.90$ in regard to the mean value f and the associated standard deviation is (delta) $f \leq 0.10$.

Accordingly, the carbonitride powders according to the invention are distinguished by high fineness coupled with a narrow particle size distribution and substantially spherical particles with minimal variations in particle shape.

The particle shape factor can be determined from SEM micrographs of the corresponding powder particles by linear and particle shape analysis. The powders should be prepared in such a way that the sample studied by SEM is representative, i.e. preparation is not accompanied by any accumulation or depletion of fine or coarse powder particles.

The particle dimensions may be determined by the known method of intercept length measurement. The measurements of the particle circumference U and the particle area A (two-dimensional projection of the particle onto the image surface) required for characterizing particle shape can be determined through the particle dimensions defined via $d_u = U/\pi$ and $d_A = (4A/\pi)^{1/2}$. The particle shape factor f is derived from the area A and the particle circumference U in accordance with: $f = 4\pi A/U^2$.

The diameters $d_u$ and $d_A$ characterize two different spherical comparison particles of which the projections onto the plane have (a) the same circumference U and (b) the same area A as the actual (investigated) particle wherein.

$d_u$ = diameter of a circle of which the circumference $U=\pi d_u$ is equal to the projected particle circumference $d_A$ = diameter of a circle of which the area is equal to the (projected) particle area ($d_A \leq d_u$).

Alternatively, the submicron carbonitride powders according to the invention may be characterized through their particle size distribution for the purpose of determining the particle shape factor.

Accordingly, the present invention also relates to submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_M^{(5)} Me^{(6)}_{1-L-M})$ $(C_{1-y}N_y)_z$ with $0.50 \leq L \leq 1$; $0 < M < 0.15; 0 \leq (1-L-M) \leq 0.50$; $0.10 \leq y \leq 0.95$ and $z \geq 0.90$, which are characterized in that they have the following particle size distribution characteristics (volume), as determined with a SHIMADZU centrifuge:

$d^c(10) \leq 0.35$ μm, $d^c(50) \leq 0.70$ μm, $d^c(90) \leq 1.65$ μm.

In one preferred embodiment, $Me^{(5)}$= Ta and/or Nb; $Me^{(6)}$= $M_o$ and/or W and $0.80 \leq L \leq 1.00$; $0 \leq M \leq 0.1$ and $0 \leq (1-L-M) \leq 0.20$. In addition, the hard-material powders according to the invention are distinguished with advantage by particular purity features in regard to their oxygen and carbon contents. Thus, their residual oxygen content is preferably $\leq 0.8\%$ by weight while their free carbon content is $\leq 0.1\%$ by weight. The sum total of the Br, Cl and F contents is preferably $\leq 0.1\%$ by weight. A characteristic of the particularly preferred carbonitride powders according to the invention is that they consist of unbroken primary particles.

It is crucial to and characteristic of their production that the favorable granulometric and chemical characteristic data are actually achieved in the synthesis process and do not have to be established by subsequent grinding, sizing and other thermal treatments or, in combination, cannot be established at all by these processes. The mixtures required for the synthesis of the carbonitrides according to the invention are prepared under moist conditions so that highly intensive contacting and homogeneous distribution of the reactive components (titanium oxide, metals and metal oxides of the fifth and sixth secondary group of the periodic system and also carbon) is achieved.

Accordingly, the present invention also relates to a process for the production of the carbonitride powders according to the invention by mixing stoichiometric quantities of the corresponding metal oxides, optionally metals of the $Me^{(5)}$ and $Me^{(6)}$ and carbon black, calcining this mixture in a nitrogen-containing atmosphere and subsequent grinding, characterized in that the mixture is used in the form of an aqueous suspension for calcination.

Particularly good results are obtained when the aqueous suspension contains at least one C-containing compound besides carbon black. In addition to carbon, the C-containing compound preferably consists solely of such constituents that only elements belonging to the system, such as nitrogen and oxygen, remain in the synthesis product after calcination.

It is crucial to the process according to the invention that the reaction on which the carbothermal reduction of the oxides and the subsequent carbonitriding of the metals is based, is accelerated by more uniform and shortened diffusion paths for O, C and N in the powder particles and proceeds more uniformly. The effect of the powder particles cleanly separated in aqueous solution and the C particles deposited onto the oxide particles during the drying process is that, firstly, sintering between the oxide particles is reduced and, secondly, all solid/solid and solid/gas reactions controlled through diffusion processes take place more quickly or begin and are completed at lower temperatures and also proceed locally more uniformly. Overall, this leads to powders which show minimal variations in all their chemical and granulometric parameters.

Particularly good results are obtained when the C-containing compound is present as carbohydrate(s). The aqueous suspension preferably has a water content of 20 to 60% by weight and, more preferably, 30 to 50% by weight, based on the solids content, the quantity of carbon introduced through the C-containing compound preferably amounting to between 5 and 40% by weight, based on the quantity of carbon black used.

The process according to the invention ensures that the granulometric/morphological and chemical characteristic data are actually established in the synthesis of the carbonitrides.

In process (2), the carbothermal reduction and carbonitriding of $TiO_2$-metal oxide/metal-carbon black mixtures, $TiO_2$-metal oxide/carbon black mixtures are prepared in a first step and are then calcined under nitrogen in a second step. The particularly preferred measures for the solution according to the invention lie a) in preparation of the mixtures under moist (aqueous) conditions where part of the carbon is available from aqueous solutions or suspensions of C-containing compounds and not from carbon black only, b) in the complete reaction of the dissolved or suspended C-containing compounds and c) in a synthesis carried out at low synthesis temperatures, high flow rates of the $N_2/H_2/Ar$ reaction gases and at low $N_2$ partial pressures.

More particularly, the nitrogen partial pressure is distinctly below the nitrogen equilibrium pressure (equilibrium pressure at the $(Ti, Me)C_{1-y}N_y+C_{free}$ phase boundary)

The deagglomeration of all powder particles, intensive mixing, optimal homogenization, contacting of the reactants in a manner topologically favorable to the reaction, a short reaction time and, finally, the conditions for the synthesis of fine-particle, narrow-range powders are thus guaranteed.

This together with suitably established, flowing nitrogen-containing synthesis atmospheres provides for the low calcination temperatures favorable to the carbonitrides according to the invention in the range from 1500° to 1750° C. for preferred calcination times of 30 minutes to 3 hours.

The process may be carried out as follows:

The components $TiO_2$ and (a) (Va, VIa) metal oxides and optionally (b) (Va, VIa) metals are first dry-mixed with carbon black in an intensive mixer. An aqueous solution or suspension of C-containing compounds (for example carbohydrates) in a ratio of 20 to 60% is then added in portions to the dry mixture in solid or powder form, followed by processing to a viscous paste. The paste is then dried in a drying furnace in a manner suited to subsequent processing, extruded in a perforated plate press or an extruder to form a 0.5 to 5 mm diameter and introduced into graphite crucibles for heat treatment. The material is then calcined for 30 to 180 minutes at temperatures of 1500° to 1750° C. in $N_2/H_2$ atmospheres. The (C:N) ratio required for the carbonitride is established both through the weighed quantities of components and through the temperature, the nitrogen partial pressure of the flowing gas and the total throughput of the reaction gas.

The present invention also relates to the use of the carbonitride powders according to the invention for the production of sintered compacts with submicron grain structures by sintering 3 to 25% by weight binder metals from the iron group of the periodic system of elements with the carbonitrides according to the invention and optionally other carbides and nitrides.

Water containing 0.01% Calgon was used as the sedimentation liquid for particle size determination and dispersion carried out for 10 mins. Ultrasonic bath was analyzed at a centrifugal modus of 1000 r.p.m.

Figure 1A:
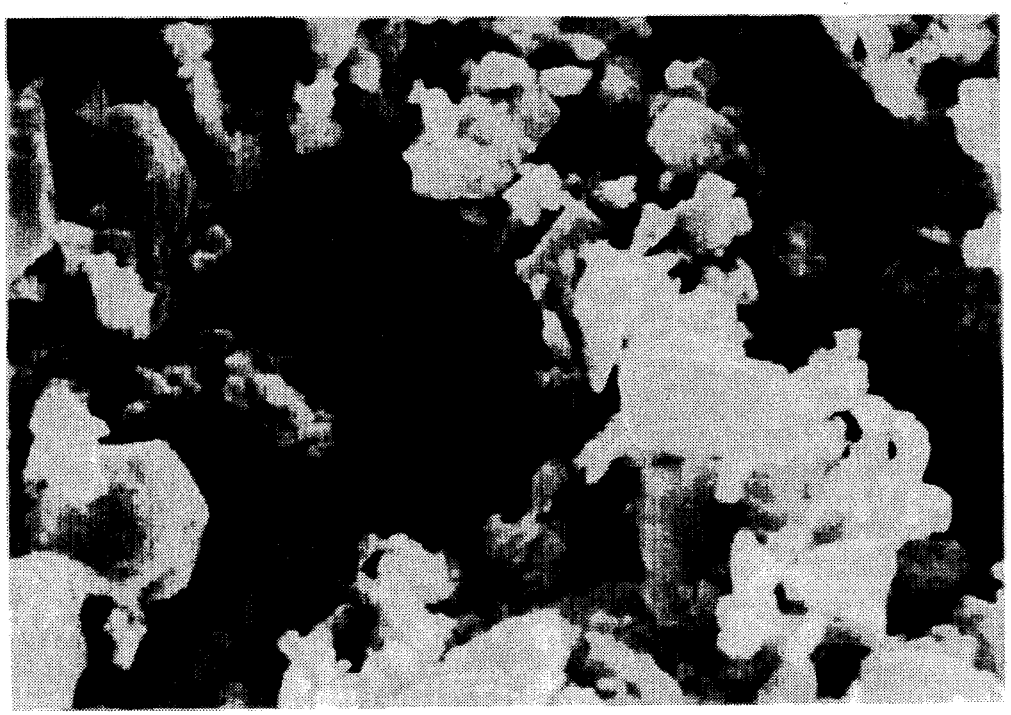
FIG. 1 (constituting microphotographs FIGS. 1A–1B) shows SEM micrographs of this carbonitride powder (grade E, bottom) and of an intensively ground carbonitride of comparable composition produced via homogenization (grade A, top).
Figure 1B:
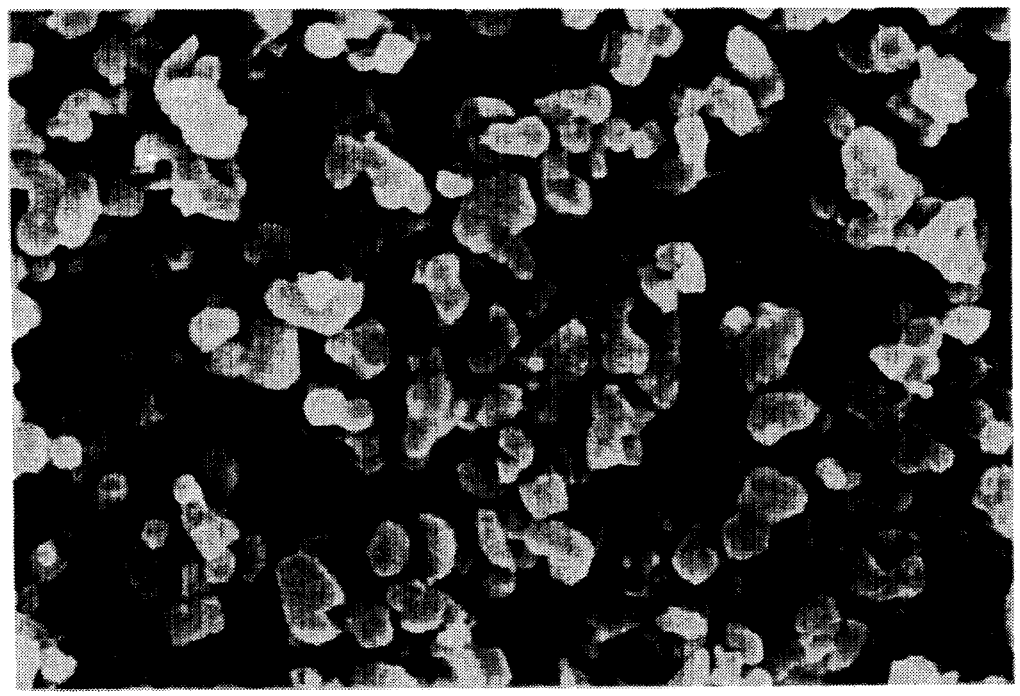
Figure 2A:
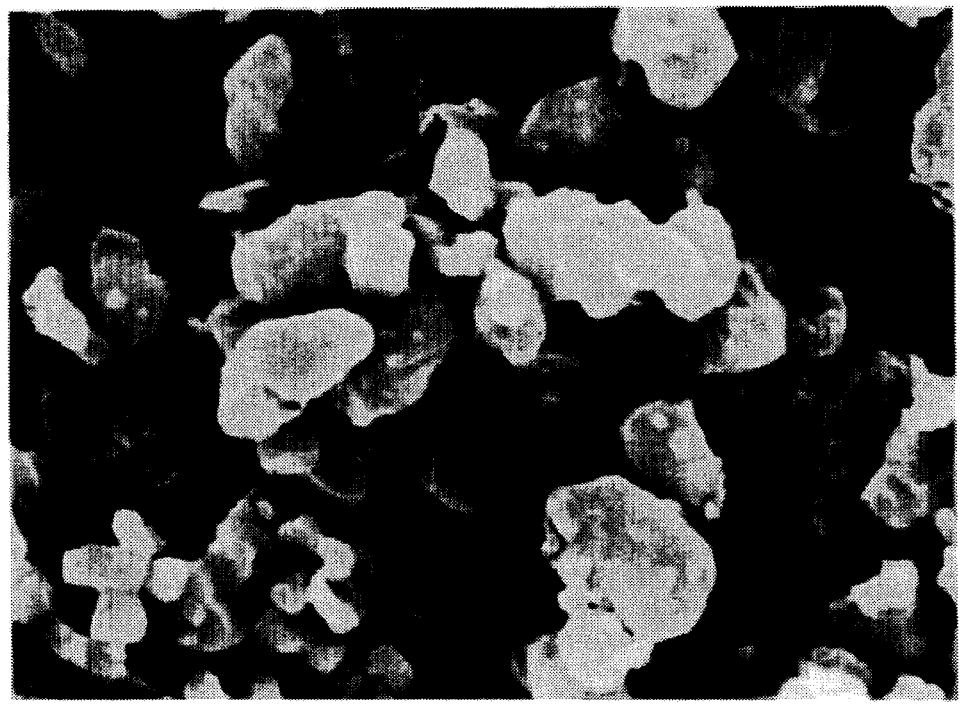
FIG. 2 (constituting microphotographs FIGS. 2A–2B) shows SEM micrographs of this carbonitride powder (grade E, bottom) and of a carbonitride of comparable composition produced by carbothermal reduction of $TiO_2$/carbon black dry blends (grade B, top).
Figure 2B:
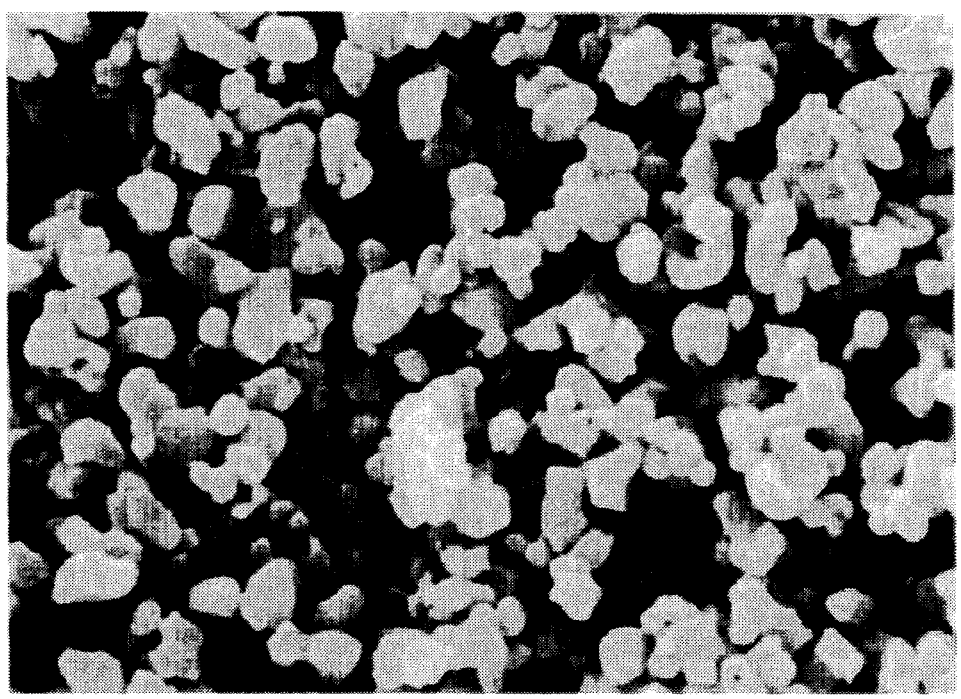
Figure 3:
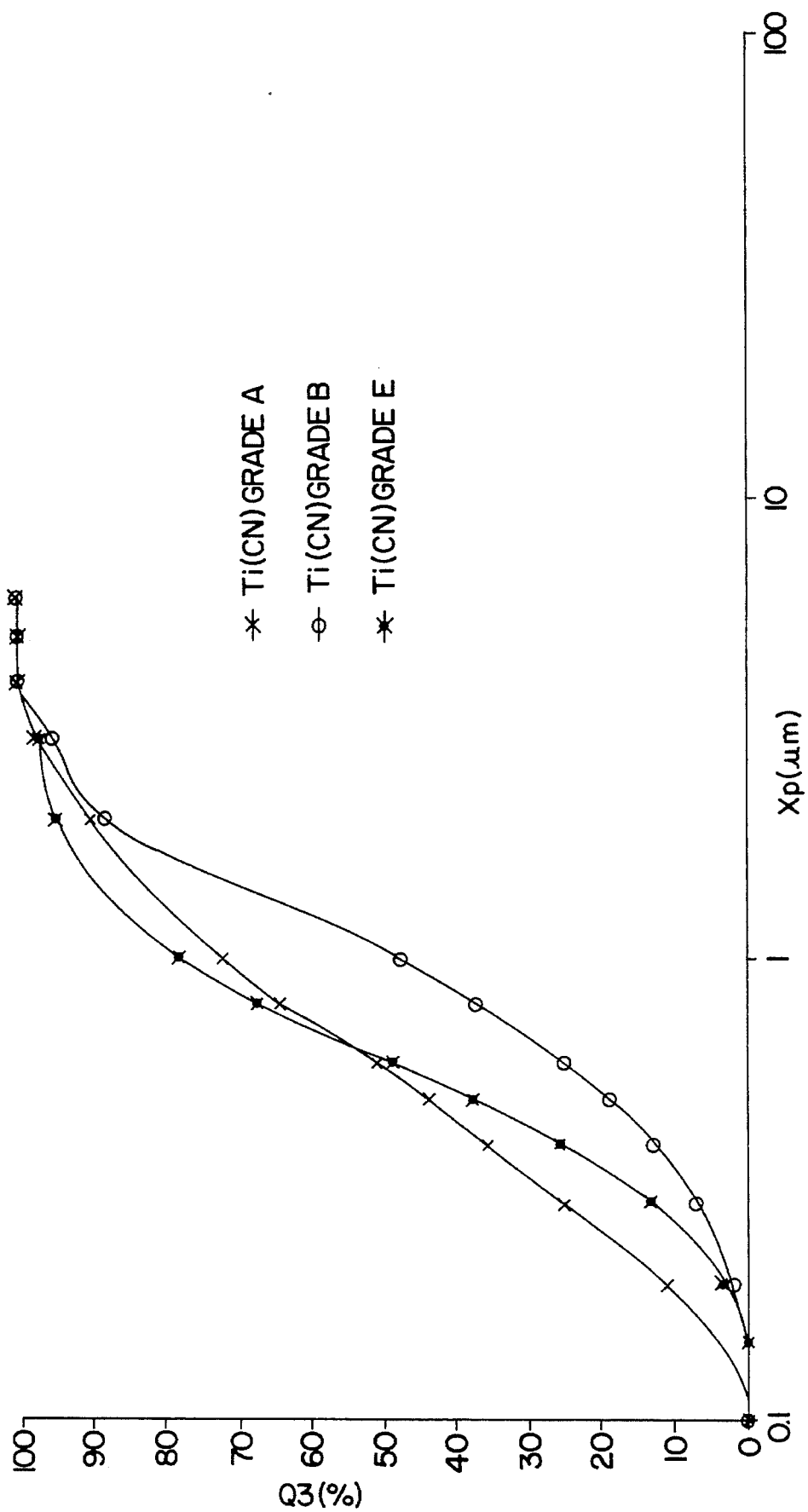
FIG. 3 shows the particle size distribution (volume) of this carbonitride powder (grade E) as determined with a SHIMADZU SA-CP 2 centrifuge by comparison with the corresponding particle size distributions of the comparison powders grade A (diffusion reacted, see FIG. 1) and grade B (carbothermal reduction of TiO2/carbon black dry blends, see FIG. 2).
Figure 4A:
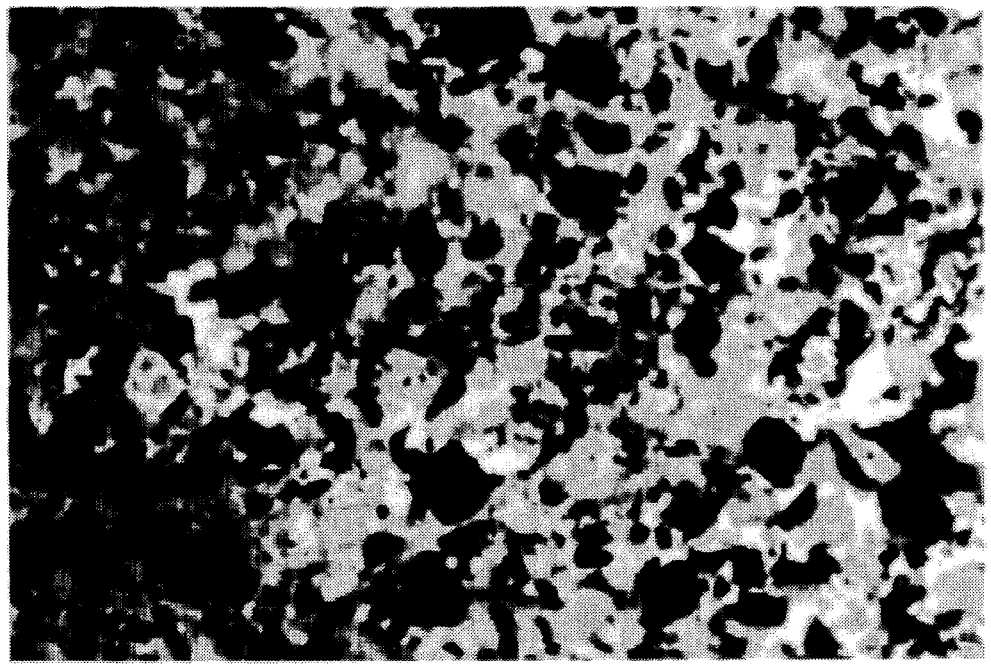
Figure 4B:
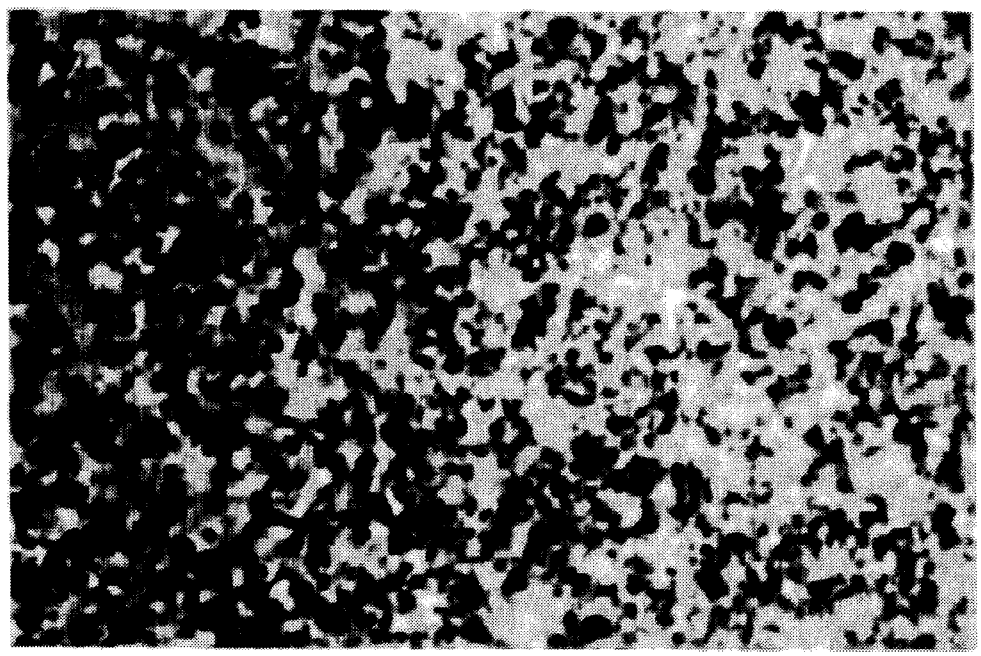

FIG. 4 (constituting microphotographs FIGS. 4A–4B) shows SEM micrographs of grain structures of cermets sintered (a) using a diffusion reacted carbonitride (grade A, top) and (b) using a carbonitride according to the invention (grade E, bottom) for otherwise the same Ni/Co binders and (W, Ta, Mo) carbides.

Figure 5:
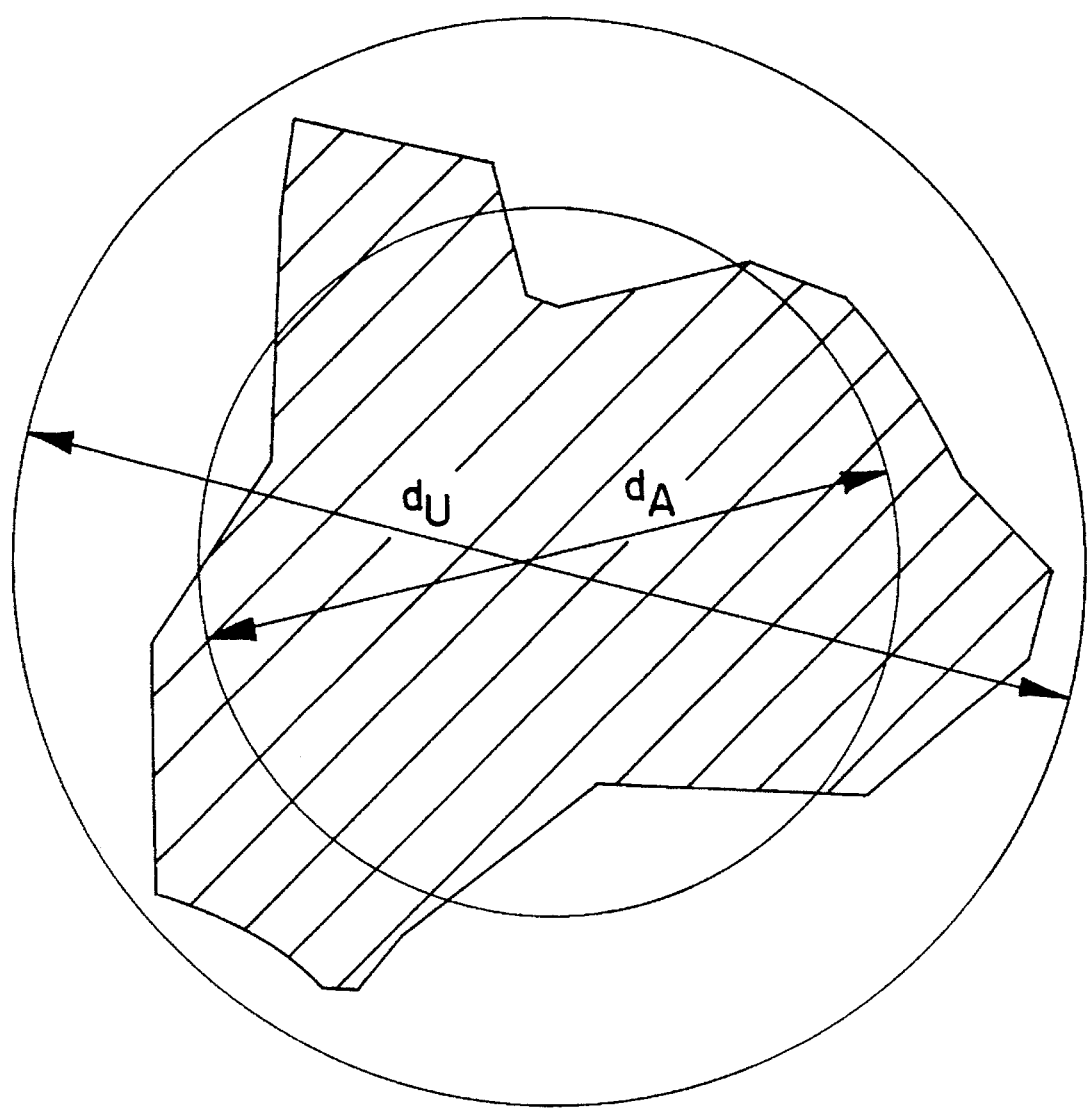

FIG. 5 is a diagrammatic illustration explaining the shape factor $f=4\pi A/U^2$.

The following Examples are intended to illustrate the invention without limiting it in any way.

EXAMPLE 1

2 kg titanium dioxide, specific BET surface 12 $m^2/g$, and 679 g carbon black, specific surface 45 $m^2/g$, were dry-mixed for 5 mins. in an intensive mixer. 1.3 l sugar solution (200 g refined sugar to 1.2 l distilled water) was then added in portions, the rotational speed of the intensive mixer being gradually increased. After mixing for 15 minutes at rotational speeds of 2500 r.p.m. for the mixer shaft and 64 r.p.m. for the mixer pot, a homogeneous, viscous paste was formed and was removed from the mixer and dried for approx. 5 h at 80° C. in a drying furnace in which it was spread out in a layer thickness of approx. 2 cm. The still sufficiently viscous paste was then extruded in a perforated-plate press to form a 1.5 mm diameter strand and introduced loosely into a graphite crucible. The material thus prepared and placed in the graphite crucible was isothermally calcined for 80 mins. at 1600° C. in a flowing $N_2/H_2$ atmosphere. The heating rate for the synthesis material was 5K/min. The $N_2/H_2$ gas throughput was 33 l/min., the partial pressure of the nitrogen in the gas atmosphere reaching 10 to 50% of the thermodynamic nitrogen equilibrium pressure and the $N_2/H_2$ reaction gas flowing over the synthesis material at a rate of approx. 35 m/min. In order to intensify the reaction and better to dissipate the CO formed, the front and rear ends of the synthesis crucible were provided with gas inlet and outlet slots and suitable gas directing systems were arranged in the furnace.

After the synthesis, the carbonitrided material was still present in strand-like or spaghetti-like form, but could easily be crushed by hand. Dry grinding for 4 h in a ball mill at 60 r.p.m. (ratio by weight of grinding elements to carbonitride powder 5:1) was sufficient for complete deagglomeration of the powder. The carbonitride powder thus produced is characterized by the following data and by FIGS. 1 to 4 (percentages are percent by weight):

| | |
|---|---|
| Total carbon ($C_{tot.}$): | 9.79% |
| Free carbon ($C_{free}$): | 0.02% |
| Nitrogen content: | 11.30% |
| Oxygen content: | 0.51% |
| Chloride content: | <0.10% |
| FISHER particle size (ASTM B 330, FSSS) | 0.85 μm |

-continued

| | |
|---|---|
| Specific surface (BET acc. to DIN 66 131) | 3.56 m²/g |
| SEM particle size $d_B$ | 0.75 μm |
| Standard deviation of particle size (delta) $d_B$ | 0.29 μm |
| Shape factor (mean value) f | 0.86 |
| Standard deviation of shape factor (delta) f | 0.09 |
| d(10) value acc. to SHIMADZU[1] | 0.28 μm |
| d(50) value acc. to SHIMADZU[1] | 0.61 μm |
| d(90) value acc. to SHIMADZU[1] | 1.28 μm |

[1] Basic principles of sedimentation analysis. Evaluation equations for quantitative measurement in a centrifugal field, Supplement 1 to DIN 66 111, February 1989.

The analysis corresponds to an (oxy)carbonitride having the following stoichiometric composition:

$TiC_{0.498}N_{0.494}O_{0.023}$ or $Ti(C_{0.491}N_{0.487}O_{0.022})_{1.015}$.

EXAMPLE 2

To produce a TiCN carbonitride using the same starting materials, titanium dioxide $TiO_2$ and carbon black, a mixture containing 2 kg $TiO_2$ and 623 g carbon black was weighed in and mixed with a sugar solution (184.5 g refined sugar to 1.3 l distilled water) in an intensive mixer, dried and extruded. The synthesis was again carried out at 1600° C. (isothermal holding time 80 mins.), but with a distinctly increased overall throughput of 72 l/min. $N_2H_2$ gas mixture and a nitrogen partial pressure in the flowing gas of 5 to 25% of the thermodynamic nitrogen equilibrium pressure (equilibrium pressure at the $TiC_{l-y}N_y+C_{free}$ phase boundary). In contrast to the grey $TiC_{l-y}N_y$ powder of Example 1, the synthesis product was pale lilac in color and could also be worked up by non-intensive grinding and completely deagglomerated, i.e. broken up into the primary particles, without the particles themselves being crushed. The powder thus produced has the following characteristic data:

| | |
|---|---|
| Total carbon ($C_{tot}$): | 5.91% |
| Free carbon ($C_{free}$): | 0.02% |
| Nitrogen content: | 15.90% |
| Oxygen content: | 0.60% |
| Chloride content: | <0.10% |
| FISHER particle size (ASTM B 330, FSSS) | 0.90 μm |
| Specific surface (BET acc. to DIN 66 131) | 3.20 m²/g |
| SEM particle size $d_B$ | 0.72 μm |
| Standard deviation of particle size (delta) $d_B$ | 0.35 μm |
| Shape factor (mean value) f | 0.87 |
| Standard deviation of shape factor (delta) f | 0.10 |
| d(10) value acc. to SHIMADZU[1] | 0.29 μm |
| d(50) value acc. to SHIMADZU[1] | 0.67 μm |
| d(90) value acc. to SHIMADZU[1] | 1.39 μm |

[1] Basic principles of sedimentation analysis. Evaluation equations for quantitative measurement in a centrifugal field, Supplement 1 to DIN 66 111, February 1989.

The analysis corresponds to an (oxi)carbonitride having the following stoichiometric composition:

$TiC_{0.304}N_{0.701}O_{0.023}$ or $Ti(C_{0.296}N_{0.682}O_{0.022})_{1.028}$.

To determine the shape factor, approx. 200 particles are evaluated by linear and particle shape analysis using enlarged SEM micrographs (magnification $10^4$x). The particle dimensions were determined by the known method of intercept length measurement. In addition, the particle dimensions defined via $d_u=U/\pi$ and $d_A=(4A/\pi)^{1/2}$ were determined from the measurements of the particle circumference U and the particle area A required for particle shape characterization (two-dimensional projection of the particle onto the image surface). The particle shape f derives from the area A and the particle circumference U as follows: $f=4\pi A/U^2$. The diameters $d_u$ and $d_A$ characterize two different spherical comparison particles of which the projections onto the plane have (a) the same circumference U and (b) the same surface A as the actual (investigated) particle.

FIG. 5 is a scematic illustration explaining the shape factor $f=4\pi A/U^2$.

$d_u$=diameter of a circle of which the circumference $U=\pi d_u$ is equal to the projected particle circumference $d_A$=diameter of a circle of which the area is equal to the (projected) particle area ($d_A \leq d_u$).

What is claimed is:

1. Submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_m^{(5)} Me^{(6)}_{1-L-m})(C_{1-y}N_y)_z$ with $0.50 \leq L \leq 1; 0 \leq M \leq 0.15; 0 \leq (1-L-M) \leq 0.50; 0.10 \leq y \leq 0.95$ and $z \geq 0.90$, wherein the particle shape factor f determined from SEM image analyses lies within the limits $0.80 \leq f \leq 0.90$ in regard to the mean value f and the associated standard deviation (delta) f is $\leq 0.10$.

2. Submicron carbonitride powders of titanium and, optionally, other transition metals of the fifth ($Me^{(5)}$) and sixth ($Me^{(6)}$) secondary group of the periodic system of elements which have the following general molar composition: $(Ti_L Me_m^{(5)} Me^{(6)}_{1-L-m})(C_{1-y}N_y)_z$ with $0.50 \leq L \leq 1; 0 \leq M \leq 0.15; 0 \leq (1-L-M) \leq 0.50; 0.10 \leq y \leq 0.95$ and $z \geq 0.90$, wherein the powders have the following particle size distribution characteristics (volume), as determined with a SHIMADZU centrifuge:

$d^c(10) \leq 0.35$ μm, $d^c(50) \leq 0.70$ μm, $d^c(90) \leq 1.65$ μm.

3. Carbonitride powders as claimed in claim 1, wherein $Me^{(5)}$ is at least one of Ta and Nb, $Me^{(6)}$ is at least one of Mo and W and $0.80 \leq L \leq 1.00$ $0 \leq M \leq 0.10$ and $0 \leq (1-L-M) \leq 0.20$.

4. Submicron carbonitride powders of titanium and, optionally, other transition metals of the fifth ($Me^{(5)}$ and sixth ($Me^{(6)}$ secondary group of the periodic system of elements which have the following general molar composition: $(Ti_L Me_M^{(5)} Me^{(6)}_{1-L-M}) (C_{1-y}N_y)z$ with $0.50 \leq L \leq 1; 0 \leq M \leq 0.15; 0 \leq (1L-M) \leq 0.50; 0.10 \leq y \leq 0.95$ and $z \geq 0.90$, wherein the particle shape factor f determined from SEM image analyses lies within the limits $0.80 \leq f \leq 0.90$ in regard to the mean value f and the associated standard deviation (delta) f is $\leq 0.10$ and wherein the powders have a residual oxygen content of $\leq 0.8$% by weight and a free carbon content of $\leq 0.1$% by weight.

5. Carbonitride powders as claimed in claim 1, wherein the powders are substantially free of Br, Cl and F components to the extent that the sum total of the Br (bromine), Cl (chlorine) and F (fluorine) content of the powders is $\leq 0.1$% by weight.

6. Carbonitride powders as claimed in claim 1, wherein the powders consist essentially of unbroken primary particles.

7. Sintered compacts with submicron grain structures formed by sintering the carbonitride powders of claim 1 with 3 to 25% by weight binder metals from the iron group of the periodic system of elements.

* * * * *